United States Patent [19]

Pradt

[11] 4,100,730

[45] Jul. 18, 1978

[54] REGULATION OF A WET AIR OXIDATION UNIT FOR PRODUCTION OF USEFUL ENERGY

[75] Inventor: Louis Atwater Pradt, Wausau, Wis.

[73] Assignee: Sterling Drug, Inc., New York, N.Y.

[21] Appl. No.: 689,264

[22] Filed: May 24, 1976

Related U.S. Application Data

[63] Continuation-in-part of Ser. No. 583,754, Jun. 4, 1975, abandoned.

[51] Int. Cl.² ............................ F02C 3/20; F02G 3/00
[52] U.S. Cl. .................................. 60/39.05; 210/63 R
[58] Field of Search ............. 60/39.02, 39.05, 39.46 S; 122/31 A; 126/360 A; 210/63 R; 137/386

[56] References Cited

U.S. PATENT DOCUMENTS

| | | | |
|---|---|---|---|
| 2,665,249 | 1/1954 | Zimmerman | 210/63 |
| 2,824,058 | 2/1958 | Zimmermann | 210/63 |
| 2,903,425 | 9/1959 | Zimmermann | 210/63 |
| 2,944,396 | 7/1960 | Barton et al. | 60/39.05 |
| 3,626,874 | 12/1971 | Grant | 210/63 |

Primary Examiner—Louis J. Casaregola
Attorney, Agent, or Firm—Charles R. Fay

[57] ABSTRACT

A wet oxidation apparatus comprising a reactor vessel, means for continuously introducing combustible material, water, and oxygen containing gas, into the reactor; the heat of combustion in the reactor being sufficient to evaporate the water supplied to said reactor, means controlling the quantity of water fed to the reactor, thereby maintaining the liquid level in the reactor, and a gas and water vapor outlet for the reactor; gas and water vapor discharging from the reactor being passed through a turbine or similar device to produce mechanical power. The air supplied to the reactor is controlled to be insufficient to oxidize all of the fuel supplied to the reactor, or alternately, the reactor is operated in a way to enrich the gas and water vapor stream discharging from the reactor with organic matter, said enriched stream being subjected to vapor phase oxidation creating a superheated stream improving the efficiency of the power producing cycle.

15 Claims, 5 Drawing Figures

REGULATION OF A WET AIR OXIDATION UNIT FOR PRODUCTION OF USEFUL ENERGY

This application is a continuation-in-part of Ser. No. 583,754, filed June 4, 1975, now abandoned.

BACKGROUND OF THE INVENTION

Wet oxidation is a known technology and is practiced commercially. See, for example, Zimmermann U.S. Pat. Nos. 2,665,249, 2,824,058, and 2,903,425, and Barton et al U.S. Pat. No. 2,944,396. Systems for producing useful energy with wet oxidation systems have been patented and placed in commercial use.

FIG. 1 is a flow sheet of a prior art example of a wet oxidation system as practiced commercially to the present time. Generally it is stressed that the fuel value in such a system is a "waste" dispersed in water. The emphasis has been on the treatment of waste streams and energy production is secondary or incidental. This is proper for waste treatment where the primary purpose of the wet oxidation unit is treatment of the waste and elimination of pollution. However there is a class of combustible materials, for example, solid wastes or refuse, low grade fuels or fuels which present problems in conventional combustion, for example, fuels having high moisture content, high ash content or high sulfur content, to which wet oxidation can be advantageously applied and for which a modified and improved wet oxidation system and apparatus, optimized for energy recovery can be used. The present invention arises from the need for such a system.

SUMMARY OF THE INVENTION

A wet oxidation apparatus and method that includes a reactor, means continuously introducing water into the reactor, and fuel into the water in the reactor, as well as oxygen bearing gas, with means to regulate the heat of combustion of the fuel so that it vaporizes all the water introduced to the reactor while maintaining a constant liquid level in the reactor or in the separator following the reactor by regulating the amount of water supplied.

In wet air oxidation systems built or contemplated up to the present time, contrary to the present invention, a substantial portion of water is removed as a liquid from the reaction zone and liquid level or levels are maintained by controlling the amount of liquid discharged from the system. This is shown in FIG. 1, in which a valve controlling the flow of liquid from the system is positioned according to the liquid level.

PREFERRED EMBODIMENTS OF THE INVENTION

Figure 2:
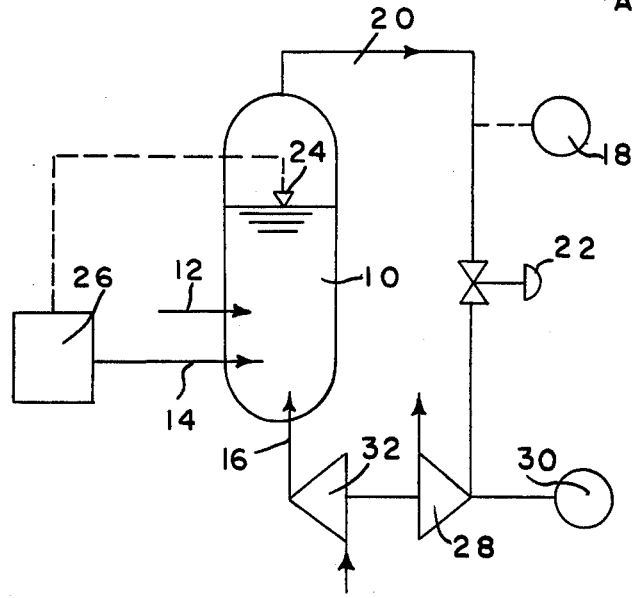
FIG. 2 is a flow diagram illustrating the present invention.

The present invention is exemplified in FIG. 2. A fuel, by which is meant any substance having a fuel value capable of being combusted, is injected into a reactor vessel 10 as at 12. The vessel is nearly full of water and the level thereof is maintained. Water and air are introduced into the reactor vessel as at 14 and 16 respectively, and the vessel is maintained at a pressure and temperature such that the fuel dispersed or dissolved in the water is combusted by the phenomenon of wet oxidation. Pure oxygen or any oxygen-containing gas can be used in the place of air.

There are two outstanding features of this invention which distinguish it from previous wet oxidation systems. These features are:

1. The heat of combustion in the reactor is regulated so as to be sufficient to vaporize all of the water supplied to the reactor.

2. The system is controlled by maintaining constant the liquid level in the reactor by means of controlling the amount of water supplied to the reactor.

Referring again to FIG. 2, the numeral 18 represents a device for measuring oxygen in the exit gases in outlet 20; and 22 is a valve which controls the pressure upstream of the valve. As in oxidation systems of the prior art, the fuel and air are regulated so as to maintain a constant amount of residual oxygen as measured by the device 18. The valve 22 is operated to maintain the system at a constant predetermined pressure. The system pressure and temperature determine the amount of water vapor discharging from the reactor along with the non-condensable gases.

Measuring the liquid level in the reactor by a monitor at 24 and controlling said level by adjusting the amount of water introduced through a pump 26 for example, will enable the system to be operated continuously. The amount of combustion in the reactor must be sufficient to provide heat to vaporize all of the water supplied. It can be shown that the required minimum concentration of combustibles supplied will be that equivalent to about 9,000 BTU's/gallon, where a gallon in this case is the total of water in the fuel and the water supplied both with the fuel and supplied separately. This compares to, for example, in the Zimmermann U.S. Pat. No. 2,903,425, the specified minimum is 3,000 BTU/gallon and a preferred value is 7,000 BTU's/gallon. As another example in the Zimmermann U.S. Pat. No. 2,424,058, the example in the drawing would have a value of about 5,600 BTU/gallon.

In FIG. 2 the fuel and water are shown as being injected separately into the reactor. The fuel and water could be mixed outside of the reactor and injected together but the preferred method is as shown. It may be necessary and desirable to mix the fuel with some water in order to form a slurry to facilitate handling, in which case a minimum amount of water would be used for this purpose and the balance would be injected separately for control purposes.

Figure 1:
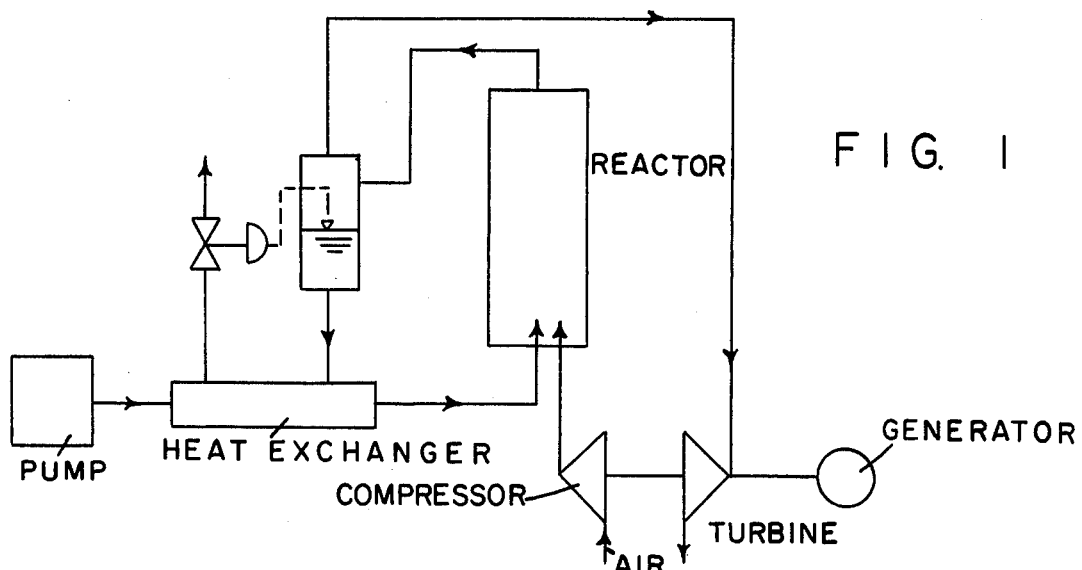
FIG. 1 is a flow diagram of a conventional wet oxidation apparatus.

The non-condensible gases and steam discharging from the reactor vessel can be used to provide useful energy by known means. In FIG. 2 a turbo-generator is shown. The efficiency of the power producing cycle will be enhanced by means of the present invention compared to the prior system of FIG. 1, since there will be no heat rejection in a system of liquid discharging from the unit. For example, going back to FIG. 1, the hot liquid discharging from the system contains a substantial amount of energy which is wasted and represents a loss of efficiency.

Those skilled in the art will recognize a flaw in the above system for most practical applications. Fuels, even very pure fuels, always contain some inorganic compounds. In the system shown in FIG. 2 these compounds will build up in the reactor vessel. This system could be operated in such a way that the inorganics would be allowed to build up and periodically the system would have to be shut down and drained and then restarted with clean water. In fact a batch type of operation is possible and may be advantageous in some cases. A reactor vessel is charged with a predetermined quantity of fuel. The vessel is sealed with water introduced to fill the reactor to a predetermined controlled level. The reactor is then heated and at a certain temperature oxygen containing gas is introduced, oxidizing the fuel and releasing the heat of combustion. The gas is discharged continuously from the vessel and carries off water vapor. Water vapor so removed would be replaced by introducing liquid water, or an aqueous solution or slurry, so as to maintain the liquid level at the predetermined point. When substantially all of the fuel has been oxidized the oxygen containing gas is stopped, the reactor depressurized, drained, and the cycle repeated. In order to provide a continuous flow of gas to an energy producing device two or more reactors would have to be provided so that while one reactor was being charged the other reactor would be in service. It can be seen that this batch system satisfies the novel features of the present invention, that is, evaporation of substantially all of the water supplied to the system and level control accomplished by regulating the amount of water added to the system. In most cases it will be more practical and economical to inject the fuel continuously and to have a continuous or intermittent blow-down such as is practiced in conventional steam boilers.

Figure 3:
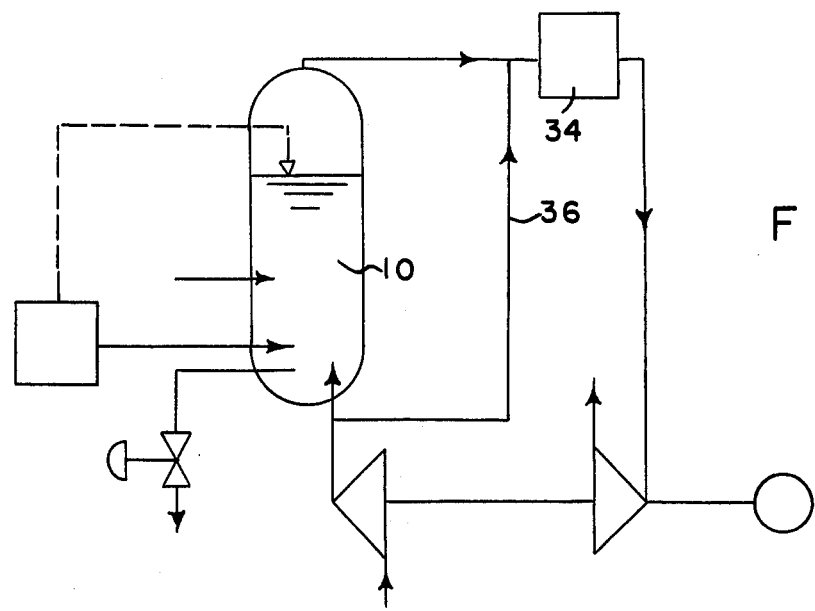
FIGS. 3, 4, and 5 are diagrams similar to that of FIG. 2, but showing modifications thereof.
Figure 4:
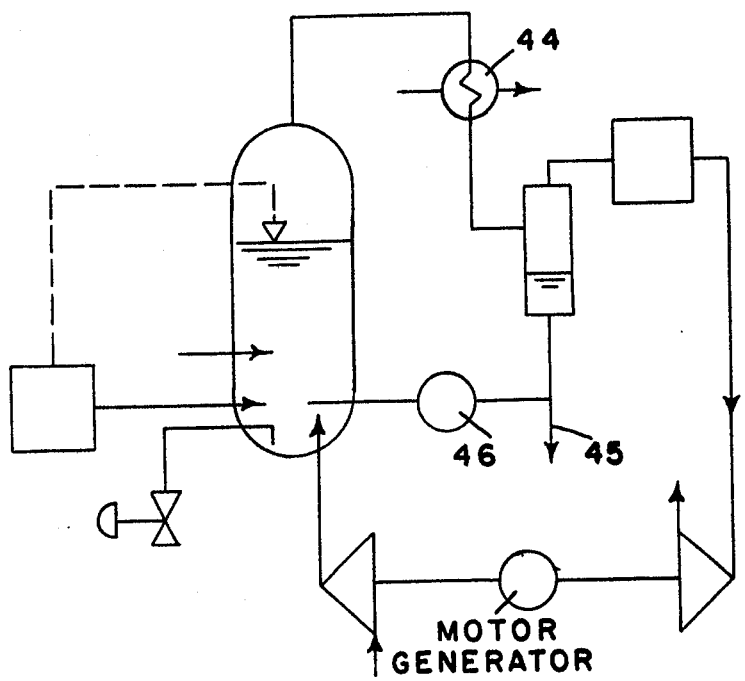

This will result in the discharge of a liquid stream. It must be understood that the discharge of this liquid stream is only for practical purposes and that ideally there would be no liquid stream discharging from the system. The blowdown is only necessary insofar as the fuel is not ideal and contains inorganic contaminants. FIGS. 3 and 4 show a blowdown line added to the bottom of the reactor vessel.

Figure 5:
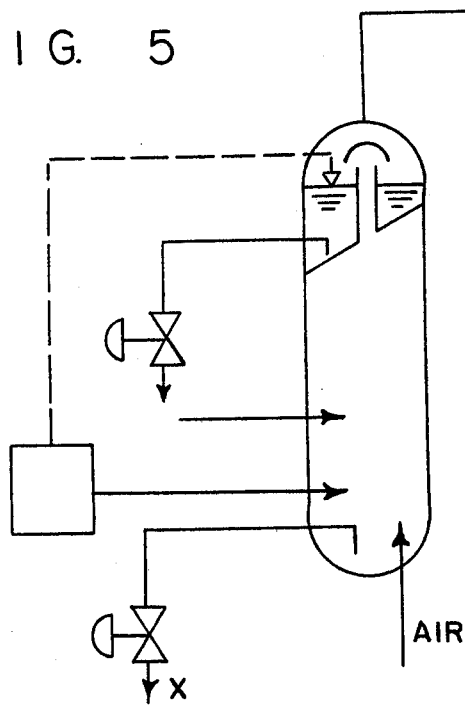

In some cases it may be desirable to remove the blowdown from the top of the reactor vessel instead of from the bottom as shown in FIGS. 3 and 4. Such a case may be, for example, when supplying the reactor with a fuel the ash content of which has a tendency to rise to the top of the reactor instead of sink to the bottom. A number of configurations for removing blowdown from the top of the vessel are possible. One such configuration is shown in FIG. 5. FIG. 5 shows a reactor that has a separator in the top. The small amount of remaining liquid along with the ash has risen to the top of the reactor, flows to the separator section, and is withdrawn from the bottom of the separator. Such a reactor could have a blowdown in the bottom of the reactor as well, as at X in FIG. 5. It can be seen that the process itself is not affected by this arrangement. Substantially all of the water is evaporated and is removed from the reactor with the gas stream. The liquid level, in this case the liquid level in the separator, is maintained by regulating the amount of water supplied to the system. The flow sheet resembles the flow sheet of the prior art, FIG. 1, but the process and the control thereof is different and novel to this invention.

The primary purpose of the process of this invention is to produce useful energy, and one means of so doing, directing the exhaust gas to a turbo-generator, is shown in FIG. 2, wherein the exhaust gases pass into a turbine 28 which can drive a generator 30 and an air compressor 32, especially useful for line 16.

This invention also provides ideal circumstances for practicing the process described by Barton et al in U.S. Pat. No. 2,944,346, in which the gas stream discharging from a wet oxidation unit is deliberately enriched with organic vapors and these organics are caused to oxidize in the vapor phase thereby creating a superheated gas stream for the turbo-generator which provides well-known improvements in the efficiency of the power producing cycle.

FIG. 3 shows how this may be employed. The air stream is split with a portion going to the reactor vessel 10 and the remainder being introduced upstream before a vapor phase oxidizer 34 through line 36 which is the preferred embodiment of this process. The air may all be introduced into the reactor and oxygen not consumed in the reactor would then be utilized in the vapor phase oxidizer, but the apparatus shown is preferred since it provides a convenient means of control. With the air and fuel rates adjusted according to the oxygen in the discharge gas and the liquid level in the reactor being maintained as before, then if the air flow is split so that a portion goes to the reactor and the remainder to the vapor phase oxidizer, a lesser amount of air supplied to the reactor vessel will result in a lesser amount of oxidation taking place in said vessel and will, according to experience in wet oxidation units, result in an increase of organic matter in the vapor phase leaving the reactor. This increased amount of organic matter in the vapor phase will oxidize in the vapor phase oxidizer causing an increase in the temperature discharging from said oxidizer. In like manner the temperature from the vapor phase oxidizer can be reduced by splitting the air so that more air goes to the reactor vessel and less directly to the vapor phase oxidizer.

EXAMPLE 1

Assume that an apparatus as shown in FIG. 3 is operated at 800 psig. Further assume that 70% of the air supplied is directed to the reactor and the remaining 30% to the vapor oxidizer 34. In the gases discharging from the reactor there will be 0.74 lbs of water vapor/lb of air entering the vapor phase oxidizer (that is, the total amount of air supplied) and the temperature out of the vapor phase oxidizer will be 1,030° F. If the efficiency of the turbine is 80% the exhaust from said turbine will be at a temperature of 263° F resulting in an enthalpy decrease of 450 BTU/lb of air. If the compressor is a four-stage device with an efficiency of 78% then 213 BTU's must be supplied per lb of air compressed and the net output of the machine shown will be 237 BTU/lb of air. If this unit were being supplied with, for example, 500 TPD of a fuel with a heating value of 7,000 BTU/lb then the net output of the turbine to the generator shaft would be about 21,000 HP.

If it is desirable to recover energy as heat instead of as mechanical power then an apparatus according to FIG. 4 could be used. In FIG. 4 apparatus 44 is a heat exchanger that removes heat from the gas stream. The gases from the reactor could be used directly for heating but these gases are a mixture of condensable vapor and noncondensable gas which contains some oxygen. This gas will be somewhat corrosive and difficult to handle. It will be more convenient and more practical to use the gases from the reactor to heat water or some other heat transfer medium. As heat is removed from the gases, the water vapor in the gases condenses to a liquid. FIG. 4 shows two alternate paths for this liquid. The liquid can be discharged from the system as shown at 45 or it can be recirculated to the reactor by means of recirculating pump 46.

In FIG. 4 the heat exchanger in which heat is extracted from the gases may be located inside the reactor and below the liquid level in the reactor; however, the heat transfer rate and the corrosive atmosphere would be unfavorable compared to the position shown. The heat exchanger could also be located in the gas dome space in the reactor vessel. If the condensed vapor is returned as liquid to the reactor this will reduce the requirements for water supplied to the reactor. Nevertheless control is effected as before by controlling the amount of water supplied to the reactor. Again the temperature to the turbine is controlled by the ratio of air split between the reactor and the vapor phase oxidizer.

The amount of mechanical power generated or recovered can be controlled by controlling the heat released in the vapor phase oxidation according to the Barton patent cited above or by regulating the amount of heat extracted from the gas by the heat exchange apparatus 44 in FIG. 4. The electrical device labeled motor-generator in FIG. 4 will have a net electrical output or input depending on the situation. If the power produced by the expander just balances the power required by the compressor then there will be no net electrical input or output.

A specific application of the apparatus in FIG. 4 would be that in which steam is generated in the heat exchanger. Boiler feedwater is admitted to the heat exchanger and the entire apparatus then becomes a boiler. If some net power is produced then steam and power are produced resulting in a facility of the sort that is used extensively to generate steam and power for industrial facilities. There is analogy here with the conventional boiler in which high pressure superheated steam is produced, said steam passing through a "topping turbine" to generate electric power and the exhaust from the turbine being used for process heating or other "plant steam" requirements.

Using the basic boiler system described above a great advantage can be derived from this system if the fuel supplied is high sulfur coal. High sulfur coal is in abundant supply but is difficult to utilize since the burning thereof results in sulfur dioxide being discharged to the atmosphere. When high sulfur coal is oxidized according to the process or processes generally described herein, it has been found that the sulfur stays in the liquid phase. The sulfur is oxidized to sulfuric acid or, if an alkali is added to the system to neutralize this acid the sulfur would exist as a sulfate salt of the alkali. The sulfur does not escape into the atmosphere as polluting sulfur dioxide. Also there are no oxides of nitrogen produced by the wet oxidation reaction and virtually no particulate matter escapes from the reactor in the gas phase. Oxides of sulfur and of nitrogen and particulate matter are serious problems with coal burning boilers. Those skilled in the art of wet oxidation will understand that a system that is fed with high sulfur coal as a basic fuel could also be used as an "incinerator" for a variety of solid and aqueous wastes.

The unit described above will operate to advantage when the basic fuel is lignite or peat both of which have a high moisture content which creates problems in conventional boilers. For the same reason such fuels as wood wastes, waste sludges and the whole catagory of fuels known as biomass can be processed advantageously in the unit described.

EXAMPLE 2

Assume a process as in FIG. 4 wherein the air is split as in example 1 above with 70% going to the reactor and 30% to the vapor phase oxidizer. Assume that the reactor exit gas and water vapor is cooled to 430° F. This will generate 0.118 lbs of 200 psig steam/lb of air supplied. The heat of combustion in the gas phase oxidizer will be the same since the same amount of air goes to this device. However, there is less water vapor in the vapor phase and therefore the temperature rise will be higher, resulting in a temperature of 1181° F to the turbine. 412 BTU's will be extracted from each pound of dry air run through the machine and the net output to the generator shaft will be 182 BTU/lb of air.

EXAMPLE 3

Assume an apparatus and process as above except that the reactor discharge gases are cooled to 410° F thus generating 0.289 lbs of 200 psig steam/lb of air. The temperature to the turbine will be 1333° F. The gross output of the turbine will be 384 BTU/lb of air and the net output 155 BTU's.

Those skilled in the art will see that the efficiency of the system can be increased by wellknown means such as using the exhaust of the turbo-generator to preheat feedwater or to preheat air and that energy could be recovered from the blowdown.

Another useful application of this invention is to provide a means to concentrate aqueous slurries or solutions in cases where it would be difficult or impossible to concentrate such solutions by conventional means. Referring to FIG. 2, a solid fuel would be injected at 12 as in the previous case. The slurry or solution to be concentrated enters at 14. Most of the water would be removed with the gas from the reactor and the resulting "blow-down" would become the product of the system. Operation and regulation of the system would be as before.

I claim:

1. A wet oxidation apparatus comprising a reactor, means for continuously introducing combustible materials, water and an oxygen containing gas into the reactor, the heat of combusion of the material in the reactor being sufficient to evaporate substantially all of the water introduced into the reactor in excess of that necessary to maintain a substantially constant liquid level in the reactor, and means controlling the quantity of water fed to the reactor to maintain the water level therein substantially constant, and a gas and water vapor outlet for the reactor.

2. A wet oxidation apparatus comprising a reactor, means for introducing combustible materials, water, and an oxygen containing gas into the reactor in separate batches, the heat of combustion of the material in the reactor being sufficient to evaporate substantially all of the water introduced into the reactor, and means controlling the quantity of water fed to the reactor to maintain the water level therein substantially constant, and a gas and water vapor outlet for the reactor.

3. The wet oxidation apparatus of claim 1 including an energy producing device energized by gas and water vapor discharged from the reactor.

4. The wet oxidation apparatus of claim 1 including means controlling the amount of oxygen bearing gas to the reactor so that it is insufficient to oxidize all the combustible material supplied, the gas and water vapor passing from the reactor being organically enriched.

5. The wet oxidation apparatus of claim 4 including a vapor phase oxidation device through which the enriched gas and water vapor passes, creating superheated vapors.

6. The wet oxidation apparatus of claim 1 including a vapor phase oxidation device for the gas and water vapor leaving the reactor.

7. The wet oxidation apparatus of claim 6 including means dividing the oxygen bearing gas prior to entry into the reactor, and means leading part to the reactor and part directly to the vapor phase oxidation device.

8. The wet oxidation apparatus of claim 6 including a heat exchanger in the gas and water vapor outlet, and a boiler feedwater line passing through the heat exchanger producing steam.

9. A wet oxidation process for producing energy in a system utilizing a reactor having inlets for combustible materials, water and an oxygen bearing gas, an outlet for gas and water vapor, and an energy producing device, said process comprising the steps of continuously introducing the combustible material, the water and the oxygen-containing gas into the reactor, combusting the material, and controlling the respective amounts of the material, water, and gas, to evaporate substantially all of the amount of water introduced while still maintaining a constant liquid level in the reactor.

10. The process of claim 9 including the step of producing superheated steam in the outlet by vapor oxidation.

11. The process of claim 10 including the step of dividing the oxygen bearing gas stream into at least two parts and introducing a part thereof into the outlet prior to the vapor oxidation step.

12. The process of claim 9 including the step of producing steam by passing boiler feedwater through a heat exchanger in the outlet.

13. A process for producing energy as in claim 9 above in which the fuel is a high sulfur coal and in which the sulfur and ash contained in said fuel is removed as slurry or solution or a mixture of each along with a minimal part of the water supplied to the system.

14. The wet oxidation process of claim 9 wherein the water supplied to the reactor includes aqueous slurries and solutions thereof.

15. The process of claim 9 above in which the fuel is lignite.

* * * * *